(12) United States Patent
Jeon

(10) Patent No.: US 8,885,130 B2
(45) Date of Patent: Nov. 11, 2014

(54) FRINGE FIELD SWITCHING MODE LIQUID CRYSTAL DISPLAY APPARATUS AND METHOD OF MANUFACTURING THE SAME

(75) Inventor: Mu-Kyung Jeon, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 252 days.

(21) Appl. No.: 13/200,372

(22) Filed: Sep. 23, 2011

(65) Prior Publication Data

US 2012/0242942 A1 Sep. 27, 2012

(30) Foreign Application Priority Data

Mar. 22, 2011 (KR) .................. 10-2011-0025403

(51) Int. Cl.
*G02F 1/1343* (2006.01)
*G02F 1/1337* (2006.01)
*G02F 1/139* (2006.01)

(52) U.S. Cl.
CPC ............ *G02F 1/1343* (2013.01); *G02F 1/1393* (2013.01); *G02F 1/133707* (2013.01); *G02F 1/134363* (2013.01); *G02F 2001/134372* (2013.01)
USPC ............ 349/141; 349/129; 349/143; 349/144

(58) Field of Classification Search
CPC ................... G02F 1/133707; G02F 1/1393
USPC ................... 349/129, 141, 143, 144
See application file for complete search history.

(56) References Cited

U.S. PATENT DOCUMENTS

| 7,643,115 B2 * | 1/2010 | Sato et al. ............ 349/114 |
| 2002/0044247 A1 * | 4/2002 | Ko et al. ............. 349/141 |
| 2002/0047972 A1 * | 4/2002 | Kim et al. ........... 349/141 |
| 2006/0256267 A1 * | 11/2006 | Bone et al. .......... 349/122 |
| 2006/0256268 A1 * | 11/2006 | Jeong et al. ......... 349/141 |

FOREIGN PATENT DOCUMENTS

| KR | 10-2000-0027766 A | 5/2000 |
| KR | 10-2006-0135179 A | 12/2006 |
| KR | 10-2007-0001652 A | 1/2007 |
| KR | 10-2009-0120772 A | 11/2009 |

* cited by examiner

*Primary Examiner* — Lucy Chien
(74) *Attorney, Agent, or Firm* — Lee & Morse, P.C.

(57) ABSTRACT

Embodiments may include a fringe field switching mode liquid crystal display (LCD) apparatus. The fringe field switching mode LCD apparatus includes a first substrate on which a first electrode and a second electrode are installed, the second electrode facing the first electrode and having a plurality of slits therein; a second substrate, which faces the first substrate; and a liquid crystal layer interposed between the first substrate and the second substrate, the first electrode having a protrusion at a slit end portion of the slits, the protrusion protruding toward the second electrode.

19 Claims, 11 Drawing Sheets

FRINGE FIELD SWITCHING MODE LIQUID CRYSTAL DISPLAY APPARATUS AND METHOD OF MANUFACTURING THE SAME

CROSS-REFERENCE TO RELATED PATENT APPLICATION

This application claims the benefit of Korean Patent Application No. 10-2011-0025403, filed on Mar. 22, 2011, in the Korean Intellectual Property Office, the disclosure of which is incorporated herein in its entirety by reference.

BACKGROUND OF THE INVENTION

1. Field of the Invention

Embodiments relate to a fringe field switching mode liquid crystal display (LCD) apparatus and a method of manufacturing the same. More particularly, embodiments relate to an enhanced fringe field switching mode LCD apparatus, in which formation of a disclination line is effectively reduced, and a method of manufacturing the same.

2. Description of the Related Art

Generally, a liquid crystal display (LCD) apparatus is driven by using optical anisotropy and polarization of liquid crystals.

A liquid crystal has a thin and long structure. Thus, directivity appears according to the arrangement of molecules. A direction in which molecules of liquid crystals are arranged may be controlled by artificially applying an electric field to the liquid crystals. Therefore, image data may be displayed by using optical anisotropy by arbitrarily controlling a direction in which molecules of liquid crystals are arranged.

SUMMARY OF THE INVENTION

Embodiments may be directed to an enhanced fringe field switching mode liquid crystal display (LCD) apparatus, and a method of manufacturing the same.

According to an embodiment, there may be a fringe field switching mode liquid crystal display (LCD) apparatus including a first substrate on which a first electrode and a second electrode are installed, the second electrode facing the first electrode and having a plurality of slits therein; a second substrate, a second substrate which faces the first substrate; and a liquid crystal layer interposed between the first substrate and the second substrate, the first electrode having a protrusion at a slit end portion of the slits, the protrusion protruding toward the second electrode.

The first electrode may be a pixel electrode, and the second electrode may be a common electrode.

At the protrusion, the common electrode may also protrude toward the liquid crystal layer.

The first substrate may further include a gate electrode layer, an active layer, and a source/drain electrode layer for applying a voltage to the pixel electrode, and the protrusion may be formed as the pixel electrode is protruded by a step forming unit formed on the source/drain electrode layer.

The first substrate may further include a gate electrode layer, an active layer, and a source/drain electrode layer for applying a voltage to the pixel electrode, and the protrusion may be formed as the pixel electrode is protruded by a step forming unit formed on the gate electrode layer.

The protrusion may be formed by a metal layer added to form a step below the pixel electrode of the first substrate.

A separate voltage may be applied to the metal layer, so that a higher voltage is applied to the slit end portion.

The protrusion may be formed to overlap a corner of the slit end portion.

The overlapping portion of the protrusion may be chamfered.

According to another embodiment, there may be a method of manufacturing a fringe field switching mode liquid crystal display (LCD) apparatus, the method including preparing a first substrate on which a first electrode and a second electrode are installed, the second electrode facing the first electrode and having formed a plurality of slits therein; preparing a second substrate, which faces the first substrate; and attaching the first substrate and the second substrate to each other by interposing a liquid crystal layer therebetween, wherein the preparing of the substrate includes forming a protrusion of the first electrode at a slit end portion of the slits, the protrusion protruding toward the second electrode.

The first electrode may be a pixel electrode, and the second electrode may be a common electrode.

At the protrusion, the common electrode may also protrude toward the liquid crystal layer.

The preparing of the first substrate may further include forming a gate electrode layer, an active layer, and a source/drain electrode layer for applying a voltage to the pixel electrode, and the protrusion may be formed as the pixel electrode is protruded by a step forming unit formed on the source/drain electrode layer.

The step of preparing the first substrate may further includes forming a gate electrode layer, an active layer, and a source/drain electrode layer for applying a voltage to the pixel electrode, and the protrusion may be formed as the pixel electrode is protruded by a step forming unit formed on the gate electrode layer.

The preparing of the first substrate may further includes adding a metal layer to form a step below the pixel electrode of the first substrate, and the protrusion may be formed as the pixel electrode, located on the metal layer, is protruded by the metal layer.

A separate voltage may be applied to the metal layer, so that a higher voltage is applied to the slit end portion.

The protrusion may be formed to overlap a corner of the slit end portion.

The overlapping portion of the protrusion may be chamfered.

BRIEF DESCRIPTION OF THE DRAWINGS

The above and other features will become more apparent by describing in detail exemplary embodiments thereof with reference to the attached drawings in which.

DETAILED DESCRIPTION OF THE INVENTION

Example embodiments will now be described more fully hereinafter with reference to the accompanying drawings;

however, they may be embodied in different forms and should not be construed as limited to the embodiments set forth herein.

Figure 1:
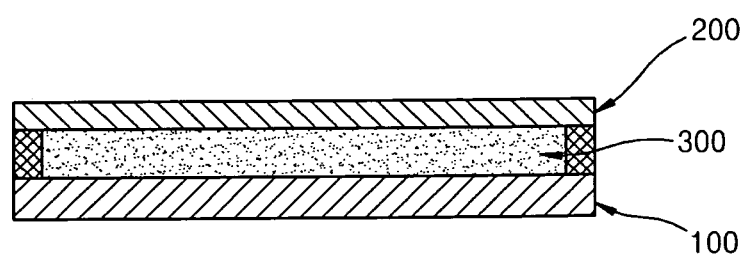
FIG. 1 is a schematic sectional view of a fringe field switching mode liquid crystal display (LCD) apparatus according to an embodiment.

FIG. 1 is a schematic sectional view of a fringe field switching mode liquid crystal display (LCD) apparatus according to an embodiment.

As shown in FIG. 1, a fringe field switching mode LCD apparatus according to the present embodiment includes a first substrate 100 and a second substrate 200, which face each other, and a liquid crystal layer 300, which is interposed between the two substrates 100 and 200. The first substrate 100 and the second substrate 200 are formed of a transparent glass material. A pixel electrode 150 (refer to FIG. 2) and a common electrode 160 (refer to FIG. 2) for driving the liquid crystal layer 300 are arranged on the first substrate 100, whereas a color filter (not shown) and a black matrix (not shown) are arranged on the second substrate 200. Therefore, the arrangement of liquid crystals in the liquid crystal layer 300 is changed by an electric field formed by the electrodes installed on the first substrate 100, i.e., a fringe field. Thus, backlight emitted from a position outside the first substrate 100 is selectively transmitted through the liquid crystal layer 300. As a result, image data is displayed via the second substrate 200.

Figure 2:
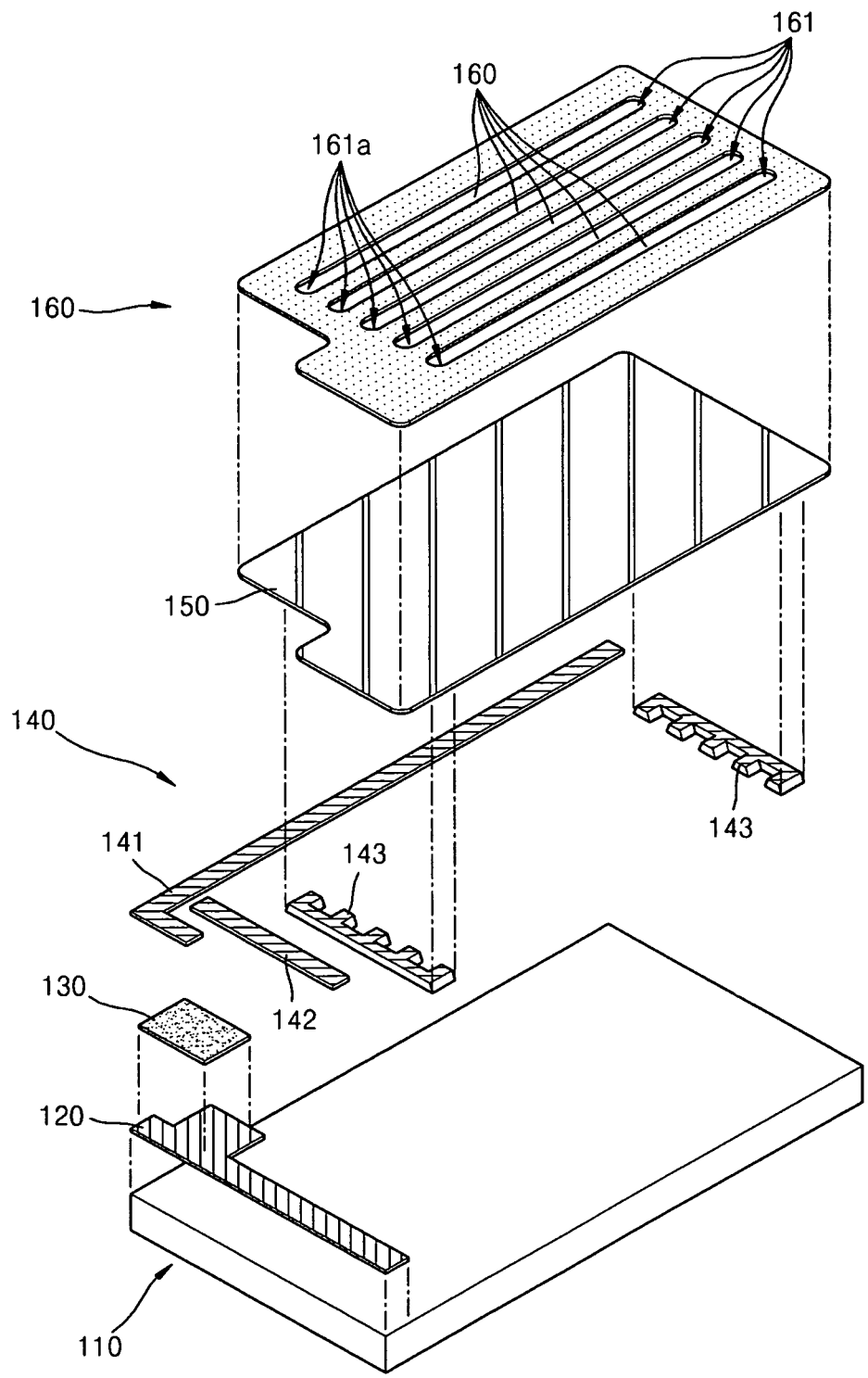
FIG. 2 shows the structure of a first substrate for forming the fringe field in detail.

FIG. 2 shows the structure of the first substrate 100 for forming the fringe field in detail. In FIG. 2, insulation layers arranged between layers are omitted so that a major stack structure of the first substrate 100 may be shown. The stack structure including the insulation layers 125 and 155 will be described below with reference to FIGS. 4 through 6.

First, as shown in FIG. 2, a gate electrode layer 120, to which a gate signal is applied, is formed on a glass substrate 110, and an active layer 130 is formed thereon by interposing a first insulation layer 125 (refer to FIG. 4) between the active layer 130 and the glass substrate 110. Next, a source/drain electrode layer 140, which includes a source electrode 141, a drain electrode 142, and a step forming unit 143, where the step forming unit 143 is arranged in correspondence to a location of a slit end portion 161a of the common electrode 160 that is to be formed later. Since the source electrode 141 and the drain electrode 142 are connected to each other via the active layer 130, a signal input to the source electrode 141 is transmitted to the pixel electrode 150 via the active layer 130 and the drain electrode 142. The step forming unit 143 helps the pixel electrode 150 to protrude toward the common electrode 160 at a slit end portion 161a of the common electrode 160. The structure will be described again with reference to FIGS. 3 and 4.

Figure 4:
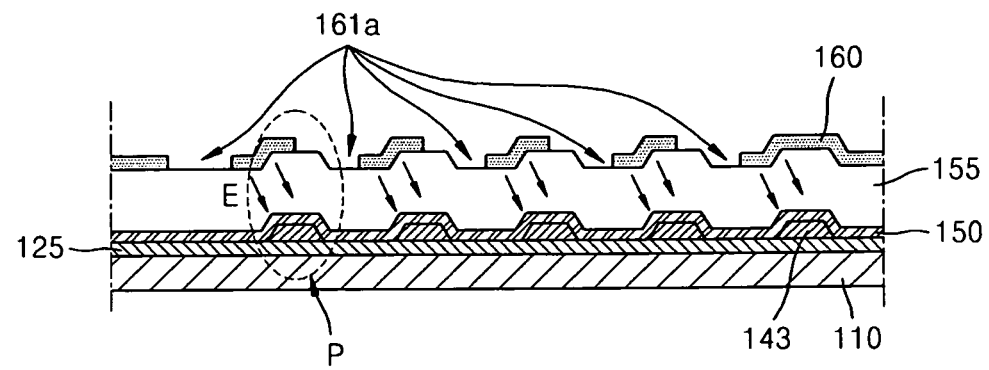
FIG. 4 is a sectional view of the first substrate, taken along a line A-A of FIG. 3.

Next, the pixel electrode 150 and the common electrode 160 are formed on the source/drain electrode layer 140 in the order stated by interposing a second insulation layer 155 (refer to FIG. 4) therebetween. The pixel electrode 150 is connected to the drain electrode 142 of the source/drain electrode layer 140, and a portion of the pixel electrode 150 contacting the step forming unit 143 forms a protrusion P along steps of the step forming unit 143, as shown in FIG. 4.

Furthermore, a plurality of slits 161 are formed in the common electrode 160, where the slit end portion 161a thereof is a portion in which disclination lines generally appear. In other words, fringe fields symmetrical to each other are formed along the two opposite sides of the slit 161. Here, since the symmetrically formed fringe fields collide with each other at the slit end portion 161 at which the two opposite sides meet each other, liquid crystals may not move in any direction. Therefore, a region in which liquid crystals do not move and image data may not be displayed normally even if a fringe field is applied thereto. Thus, a disclination line, is formed at the slit end portion 161a. Therefore, to solve this problem, the protrusion P is formed in the slit end portion 161a by using the step forming unit 143 formed in the source/drain electrode layer 140 in the present embodiment.

Figure 3:
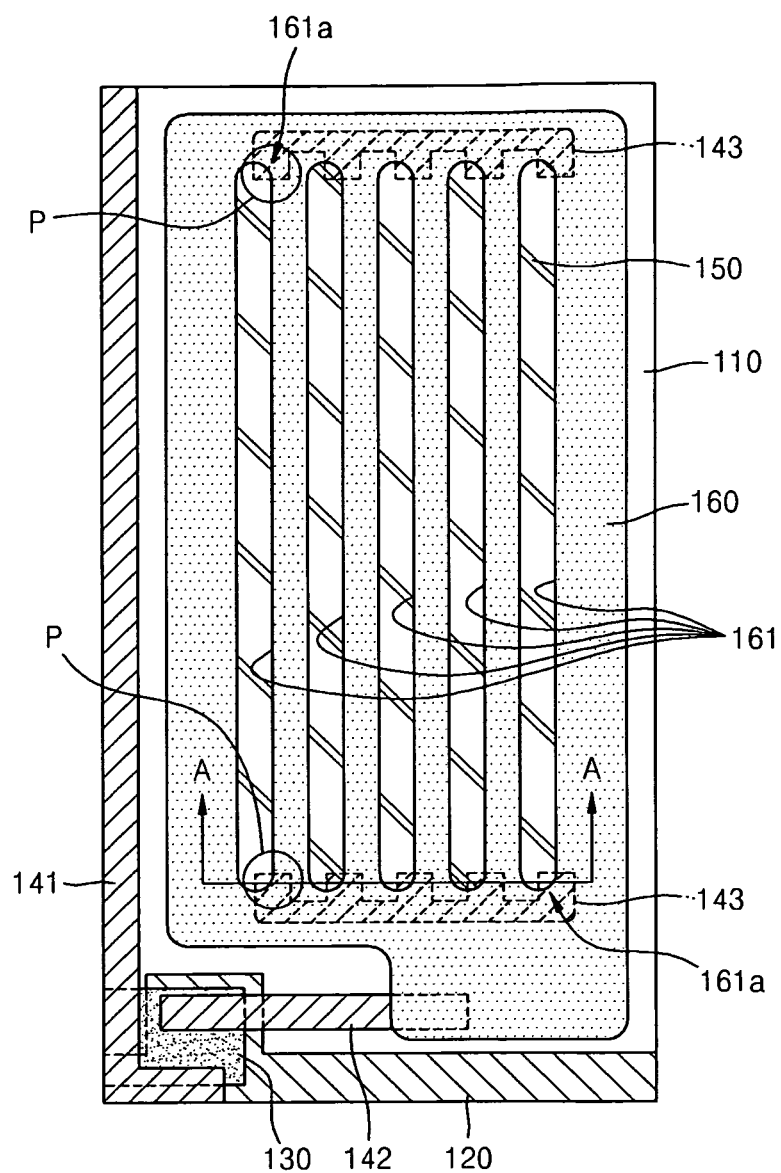
FIG. 3 is a plan view of the first substrate formed as described above.

FIG. 3 is a plan view of the first substrate 100 formed as described above, and FIG. 4 is a sectional view of the first substrate 100, taken along a line A-A of FIG. 3.

As shown in FIG. 3, the protrusion P is formed at a location corresponding to the slit end portion 161a of the common electrode 160 by the step forming unit 143 of the source/drain electrode layer 140. As shown in FIG. 3, the protrusion P is formed to overlap a corner of the slit end portion 161a. As shown in FIG. 4, the pixel electrode 150, the second insulation layer 155, and the common electrode 160 formed on the step forming unit 143 also protrude. As a result, at the slit end portion 161a, an electric field E is irregularly formed between the common electrode 160 and the pixel electrode 150. In other words, the fringe fields are formed at the slit end portion 161a asymmetrically to each other. As a result, a region, at which liquid crystals cannot move in any direction as symmetrical electric fields collide with each other at the slit end portion 161a, may be eliminated. In other words, since the fringe fields are formed to be asymmetrical to each other due to the protrusion P as described above, liquid crystals located at the slit end portion 161a may become mobile due to the asymmetric fringe fields and may freely move. As a result, formation of a disclination line at the slit end portion 161a is reduced. Thus, quality of a displayed image may be improved.

The first substrate 100 of the fringe field switching mode LCD apparatus as described above may be manufactured in the order as shown in FIGS. 5A through 5E.

Figure 5A:
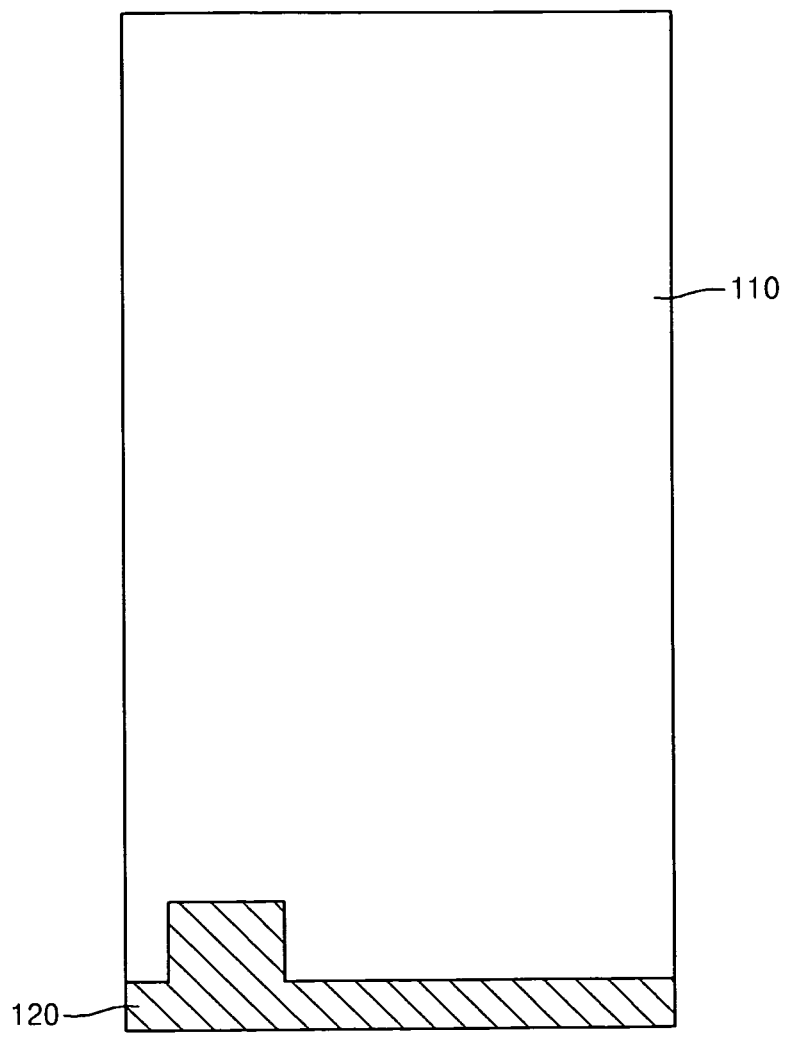
FIGS. 5A through 5E are plan views sequentially showing a process of fabricating the first substrate shown in FIG. 3.

First, as shown in FIG. 5A, the gate electrode layer 120 is formed on the glass substrate 110.

Figure 5B:
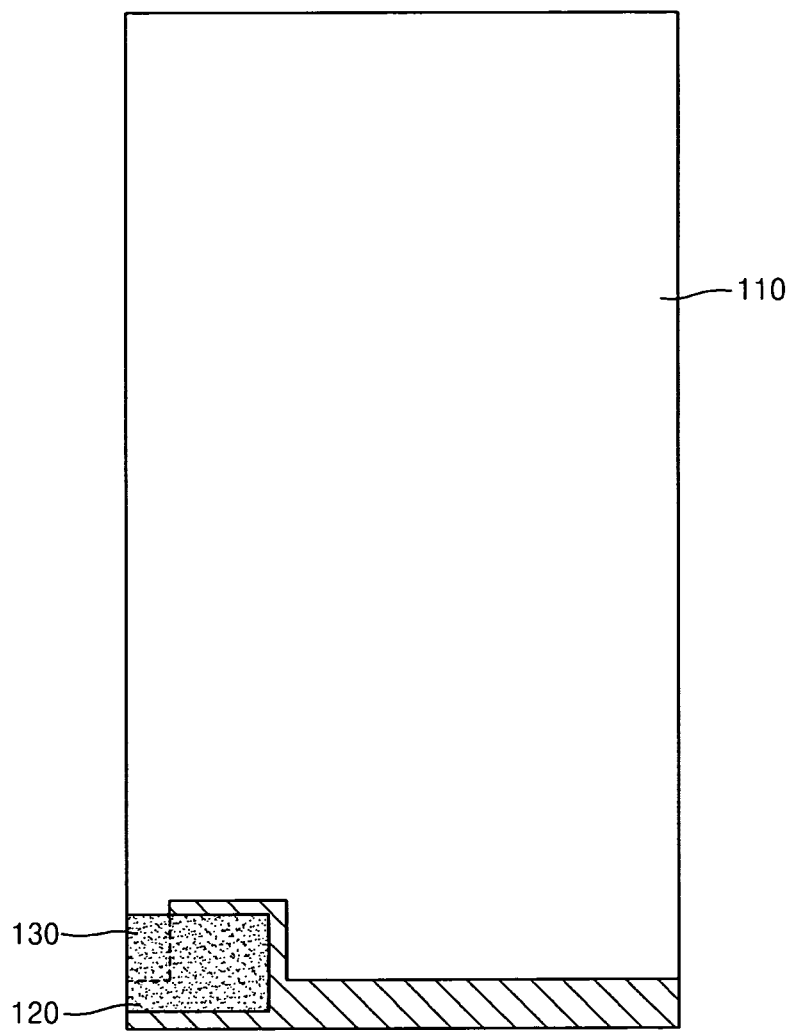

Next, as shown in FIG. 5B, the active layer 130 is formed on the gate electrode layer 120. Here, as described above, the first insulation layer 125 is formed between the gate electrode layer 120 and the active layer 130, and then the active layer 130 is formed thereon.

Figure 5C:
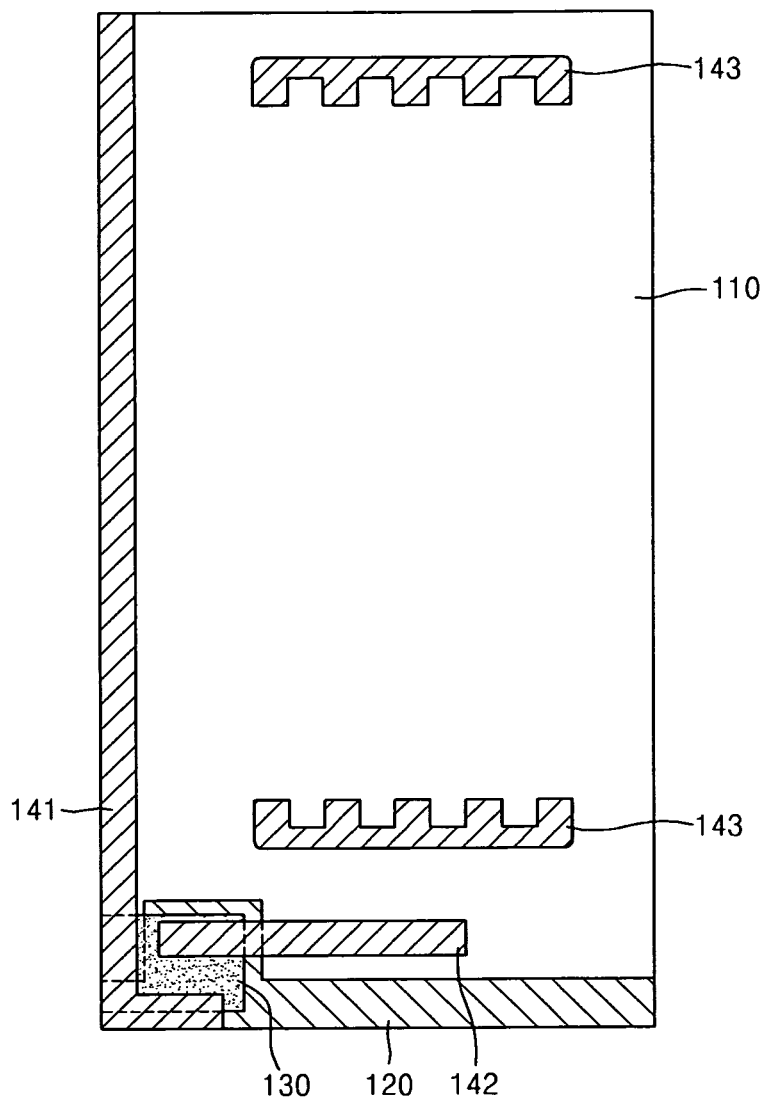

After the active layer 130 is formed, as shown in FIG. 5C, the source/drain electrode layer 140 including the source electrode 141, the drain electrode 142, and the step forming unit 143 is formed. Here, the step forming unit 143 is formed at a location corresponding to the slit end portion 161a of the common electrode 160 that is to be formed later.

Figure 5D:
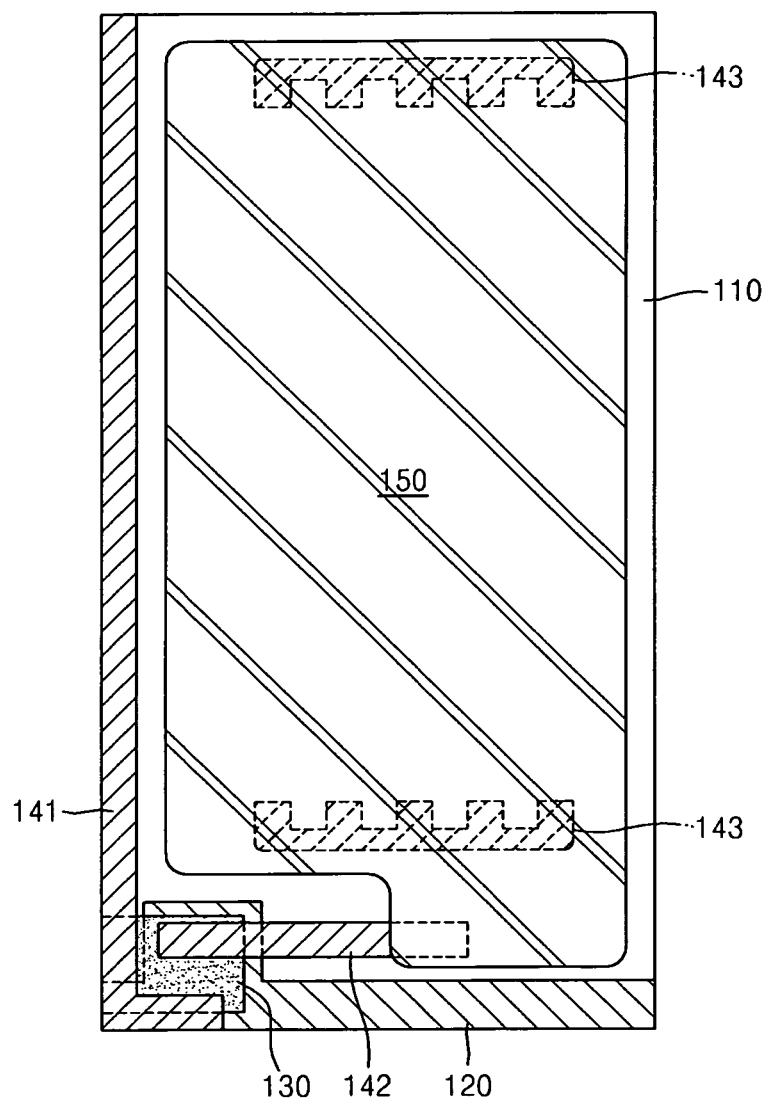
Figure 5E:
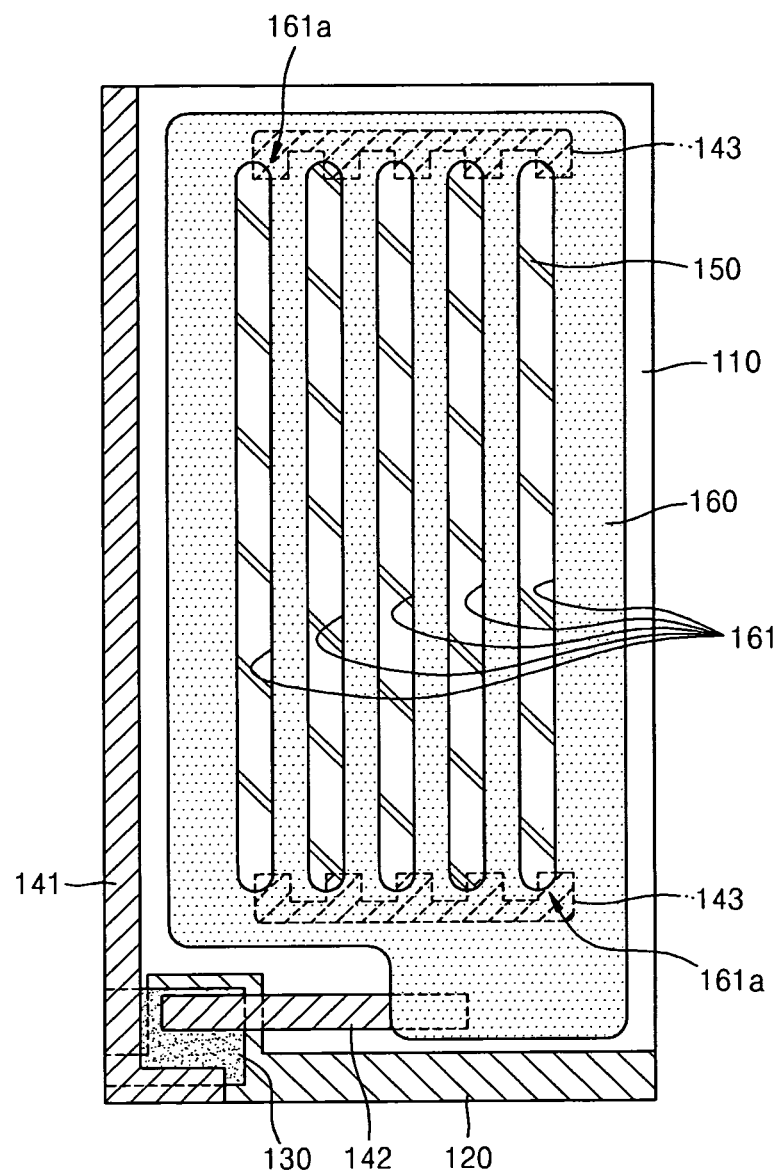

Next, the pixel electrode 150 is formed as shown in FIG. 5D, and the common electrode 160 is formed as shown in FIG. 5E. Therefore the first substrate 100 having the protrusion P is fabricated. A fringe field switching mode LCD apparatus according to the present embodiment is completed by arranging the first substrate 100 to face the second substrate 200 and forming the liquid crystal layer 300 therebetween, as shown in FIG. 1.

In a fringe field switching mode LCD apparatus manufactured as described above, formation of a disclination line that is frequently formed at the slit end portion 161a of the common electrode 160 is reduced. Thus, quality of a displayed image may be significantly improved. As a result, reliability of the fringe field switching mode LCD apparatus may be improved.

Figure 6:
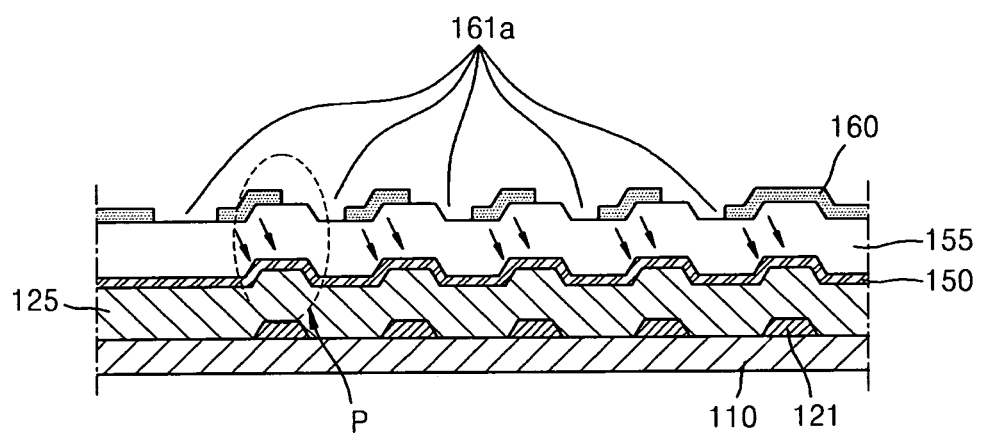
FIGS. 6 through 8 show possible modified embodiments of the first substrate shown in FIG. 2.

Meanwhile, although the step forming unit 143 is formed on the source/drain electrode layer 140 in the above embodiment, the step forming unit 143 may be formed at any location as long as the protrusion P may be formed. FIG. 6 shows a modified embodiment in which a step forming unit 121 is formed on the gate electrode layer 120 (refer to FIG. 2). In this case, all of the first insulation layer 125, the pixel electrode 150, the second insulation layer 155, and the common electrode 160 formed thereon protrude and forms the protrusion P. Like the case described above, the problem of immobility of liquid crystals is solved by forming asymmetric fringe fields at the slit end portion. Therefore, the present modified embodiment shows that the step forming unit 143 may be formed on other layers as long as the protrusion P may be formed.

Figure 7:
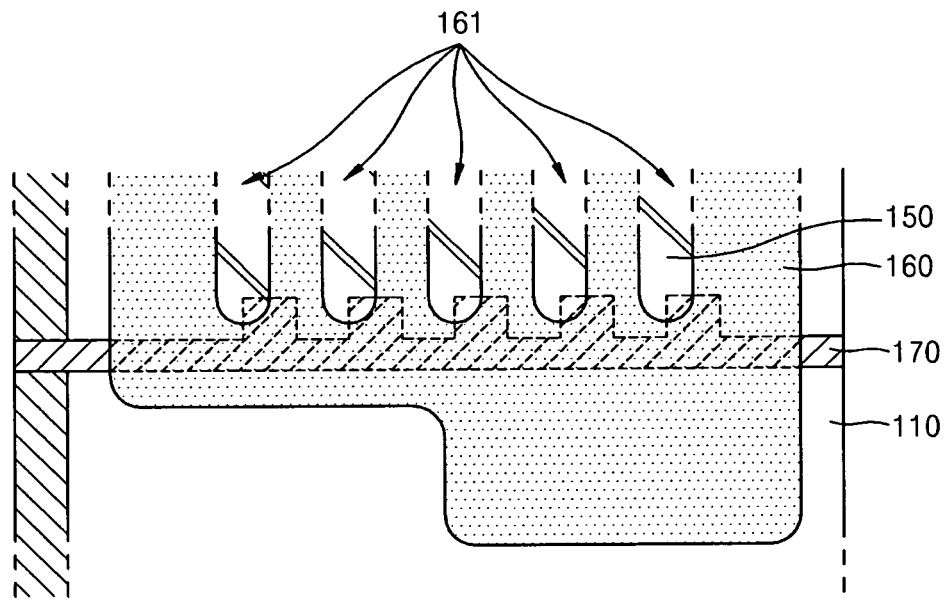

FIG. 7 shows another modified embodiment, in which a step forming unit 170 is formed as a separate layer instead of forming the step forming unit 170 together with other layers, such as the source/drain electrode layer 140 or the gate electrode layer 120. In other words, an additional operation for forming the step forming unit 170 as a separate metal layer is introduced, and a separate wiring is formed. Furthermore, it may be configured to apply a separate voltage to the step forming unit 170, so that stronger asymmetric fringe fields are formed at the slit end portion 161a.

Figure 8:
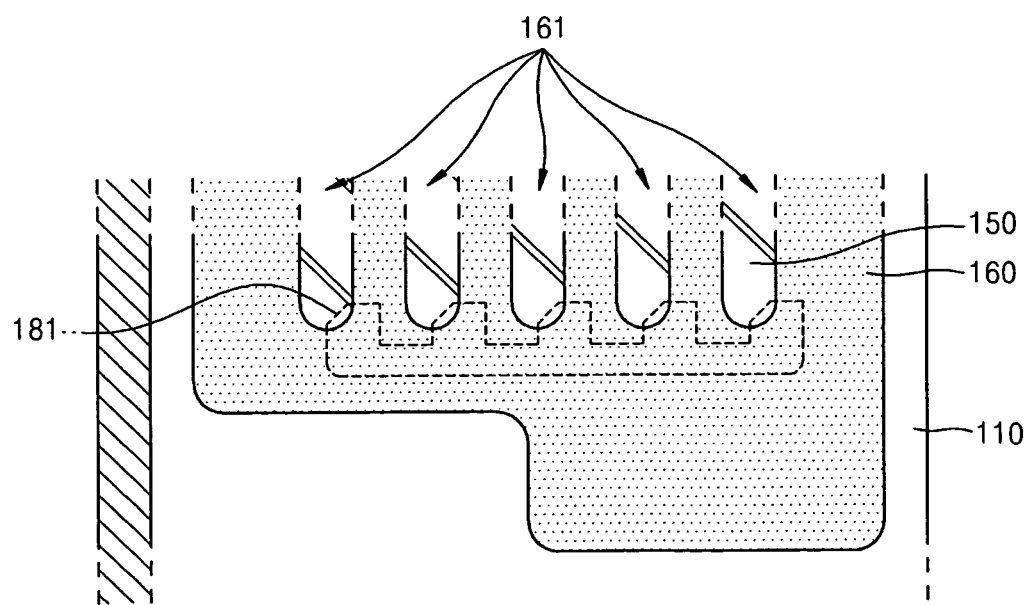

FIG. 8 shows another modified embodiment, in which a step forming unit 180 overlaps a corner of the slit end portion 161a, where the overlapping portion of the step forming unit 180 is chamfered. This means that the step forming unit 180 for forming the protrusion P may have any of various shapes.

By way of summation and review, one of the most popular examples of known LCD apparatuses include a twist nematic mode LCD apparatus, which refers to a LCD apparatus in which electrodes are respectively installed in two substrates, directors of liquid crystals filling a space between the two substrates are arranged to be twisted at 90°, and the directors are driven as voltages are applied to the electrodes.

However, such twist nematic mode LCD apparatuses have a relatively narrow viewing angle. Therefore, a fringe field switching mode LCD apparatus, which secures a wide viewing angle, is becoming popular.

A fringe field switching mode LCD apparatus is an apparatus in which both a common electrode and a pixel electrode are formed on a bottom substrate. A liquid crystal layer is formed between the bottom substrate and a top substrate, facing the bottom substrate. The liquid crystal layer is driven by forming a fringe field above the common electrode and the pixel electrode. Therefore, a fringe field switching mode LCD apparatus has a structure in which the two electrodes are arranged to overlap each other and a plurality of slits are formed in the common electrode. The common electrode is arranged close to the liquid crystal layer. A fringe field, which is an electric field pattern, is formed via the slit. Thus, liquid crystal molecules of the liquid crystal layer are arranged according to the pattern and display an image.

However, in such a fringe field switching mode LCD apparatus, an electric field is formed in a different direction at an end portion of the slit, as compared to the other portions of the slit. In other words, electric fields are formed to be symmetrical to each other along two opposite sides of the slit. However, at the end portion of the slit at which the two sides meet each other, directions of electric fields differ from those at the other portions of the slit. As a result, a domain of liquid crystals formed at the slit end portion becomes different from those at the other portions of the slit. Thus, a disclination line is formed. The disclination line refers to a discontinuity line of the arrangement of liquid crystals, which is formed at a boundary between domains. A portion of an image displayed at a portion where a disclination is formed is not smoothly connected to the other portions of the image displayed. Thus, image quality deteriorates.

In contrast, present embodiments provide an enhanced fringe field switching mode liquid crystal display (LCD) apparatus, in which formation of a disclination line is effectively reduced, and a method of manufacturing the same. As described above, in the fringe field switching mode LCD apparatus according to present embodiments, formation of a disclination line is reduced by forming asymmetrical fringe fields at the slit end portion of the common electrode. Thus, quality of displayed images and reliability of the fringe field switching mode LCD apparatus may be improved.

Exemplary embodiments have been disclosed herein, and although specific terms are employed, they are used and are to be interpreted in a generic and descriptive sense only and not for purpose of limitation.

What is claimed is:

1. A fringe field switching mode liquid crystal display (LCD) apparatus, comprising:
   a first substrate on which a pixel electrode and a common electrode are installed, the common electrode facing the pixel electrode and having a plurality of slits therein;
   a second substrate, which faces the first substrate, the common electrode being interposed between the second substrate and the pixel electrode; and
   a liquid crystal layer interposed between the first substrate and the second substrate, the pixel electrode having a protrusion at a slit end portion of the slits in the common electrode, the protrusion protruding toward the common electrode, wherein the protrusion is formed by a metal layer added to form a step below the pixel electrode of the first substrate.

2. The fringe field switching mode LCD apparatus as claimed in claim 1, wherein, at the protrusion, the common electrode also protrudes toward the liquid crystal layer.

3. The fringe field switching mode LCD apparatus as claimed in claim 1, wherein:
   the first substrate further includes a gate electrode layer, an active layer, and a source/drain electrode layer for applying a voltage to the pixel electrode, and
   the protrusion is formed as the pixel electrode is protruded by a step forming unit formed on the source/drain electrode layer.

4. The fringe field switching mode LCD apparatus as claimed in claim 1, wherein:
   the first substrate further includes a gate electrode layer, an active layer, and a source/drain electrode layer for applying a voltage to the pixel electrode, and
   the protrusion is formed as the pixel electrode is protruded by a step forming unit formed on the gate electrode layer.

5. The fringe field switching mode LCD apparatus as claimed in claim 1, wherein a separate voltage is applied to the metal layer, so that a higher voltage is applied to the slit end portion.

6. The fringe field switching mode LCD apparatus as claimed in claim 1, wherein the protrusion overlaps a corner of the slit end portion.

7. The fringe field switching mode LCD apparatus as claimed in claim 6, wherein an overlapping portion of the protrusion is chamfered.

8. A method of manufacturing a fringe field switching mode liquid crystal display (LCD) apparatus, the method comprising:
   providing a first substrate on which a pixel electrode and a common electrode are installed, the common electrode facing the pixel electrode and having a plurality of slits therein;
   disposing a second substrate to face the first substrate; and
   attaching the first substrate and the second substrate to each other with a liquid crystal layer interposed therebetween, wherein:

the preparing of the first substrate includes forming a protrusion of the pixel electrode at a slit end portion of the slits in the common electrode, the protrusion protruding toward the common electrode, the slits in the common electrode are each formed to have a first side, a gap, and a second side opposite the first side with the gap being interposed between the first side and the second side, and at the slit end portion, the first side of the slit is formed to be offset from the second side of the slit in a height direction such that the first side of the slit is spaced apart from the first substrate by a first distance and the second side of the slit is spaced apart from the first substrate by a second distance that is less than the first distance.

9. The method as claimed in claim 8, wherein, at the protrusion, the common electrode also protrudes toward the liquid crystal layer.

10. The method as claimed in claim 8, wherein:
the first substrate is formed to include a gate electrode layer, an active layer, and a source/drain electrode layer for applying a voltage to the pixel electrode, and
the protrusion is formed as the pixel electrode is protruded by a step forming unit formed on the source/drain electrode layer.

11. The method as claimed in claim 8, wherein:
the first substrate is formed to include a gate electrode layer, an active layer, and a source/drain electrode layer for applying a voltage to the pixel electrode, and
the protrusion is formed as the pixel electrode is protruded by a step forming unit formed on the gate electrode layer.

12. The method as claimed in claim 8, wherein:
the first substrate is formed to include a metal layer that forms a step below the pixel electrode of the first substrate, and
the protrusion is formed as the pixel electrode, located on the metal layer, is protruded by the metal layer.

13. The method as claimed in claim 8, wherein the protrusion overlaps a corner of the slit end portion.

14. The method as claimed in claim 13, wherein an overlapping portion of the protrusion is chamfered.

15. The fringe field switching mode LCD apparatus as claimed in claim 1, wherein:
the liquid crystal layer is above the common electrode, such that the liquid crystal layer is interposed between the common electrode and the second substrate, the common electrode protruding toward the liquid crystal layer,
the common electrode is interposed between the liquid crystal layer and the pixel electrode, and
the arrangement of liquid crystals in the liquid crystal layer is changed by forming a fringe field above the common electrode and the pixel electrode.

16. The fringe field switching mode LCD apparatus as claimed in claim 15, wherein:
the protrusion is offset from the slit such that the slit end portion exposes a high portion and a low portion of a stepped area formed by the protrusion, and
the slit end portion overlies the high portion and the low portion of the stepped area, the slit end portion conforming to the high portion and the low portion of the stepped area such that a central part of the slit end portion projects towards the liquid crystal layer relative to a side part of the slit end portion.

17. The fringe field switching mode LCD apparatus as claimed in claim 1, wherein:
the slits in the common electrode each have a first side, a gap, and a second side opposite the first side with the gap being interposed between the first side and the second side, and
at the slit end portion, the first side of the slit is offset from the second side of the slit in a height direction such that the first side of the slit is spaced apart from the first substrate by a first distance and the second side of the slit is spaced apart from the first substrate by a second distance that is less than the first distance.

18. The method as claimed in claim 8, wherein:
the liquid crystal layer is disposed above the common electrode, such that the liquid crystal layer is interposed between the common electrode and the second substrate, the common electrode protruding toward the liquid crystal layer,
the common electrode is interposed between the liquid crystal layer and the pixel electrode, and
the display is formed such that the arrangement of liquid crystals in the liquid crystal layer is changed by forming a fringe field above the common electrode and the pixel electrode.

19. A fringe field switching mode liquid crystal display (LCD) apparatus, comprising:
a first substrate on which a pixel electrode and a common electrode are installed, the common electrode facing the pixel electrode and having a plurality of slits therein;
a second substrate, which faces the first substrate, the common electrode being interposed between the second substrate and the pixel electrode; and
a liquid crystal layer interposed between the first substrate and the second substrate, the pixel electrode having a protrusion at a slit end portion of the slits in the common electrode, the protrusion protruding toward the common electrode, wherein, at the protrusion, the common electrode also protrudes toward the liquid crystal layer.

* * * * *